Dec. 11, 1945.  H. H. HARROLD  2,390,880
ROTARY REVERSING ENGINE
Filed Aug. 16, 1944  5 Sheets-Sheet 2

Inventor
Harmon H. Harrold
By Frease and Bishop
Attorneys

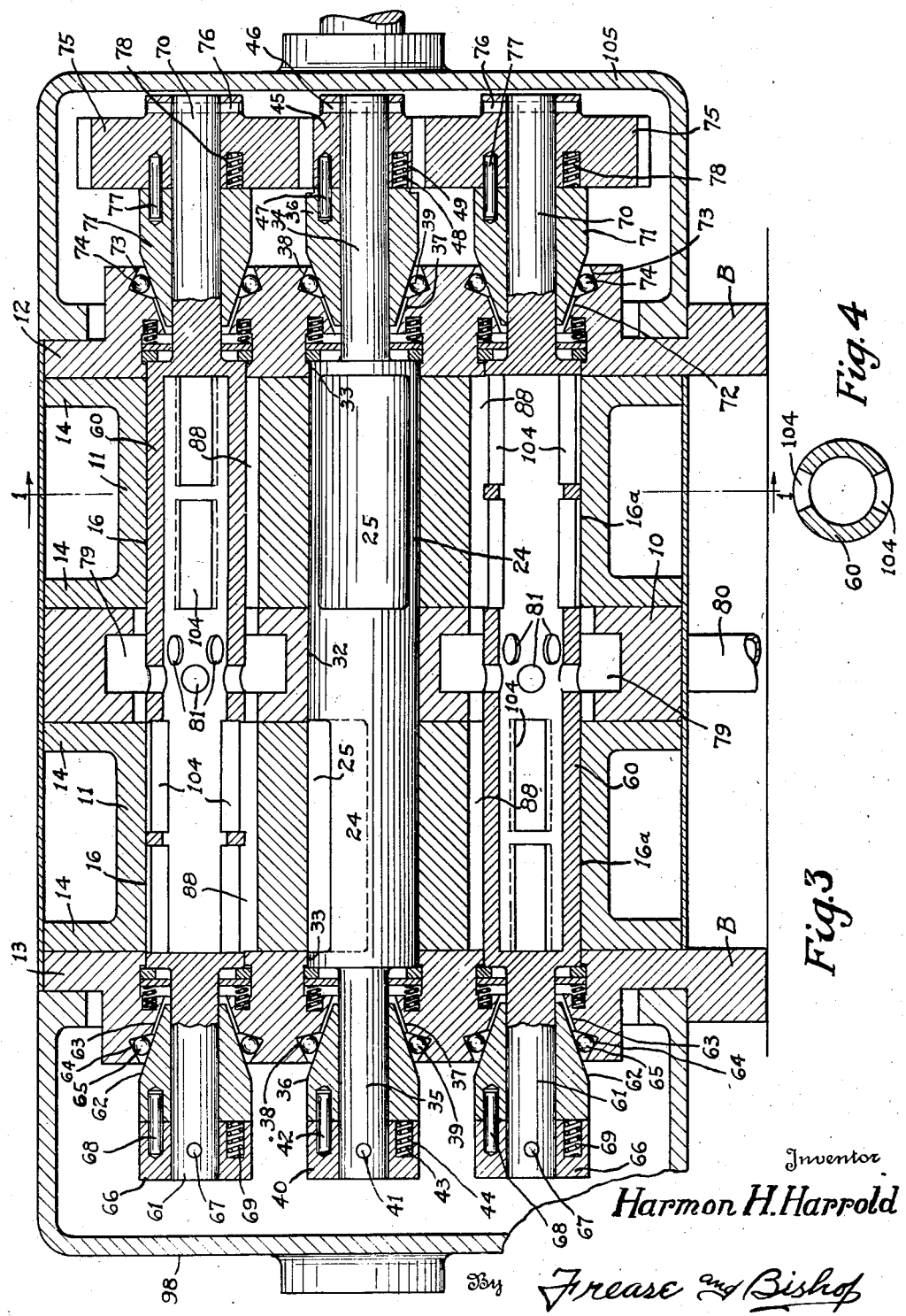

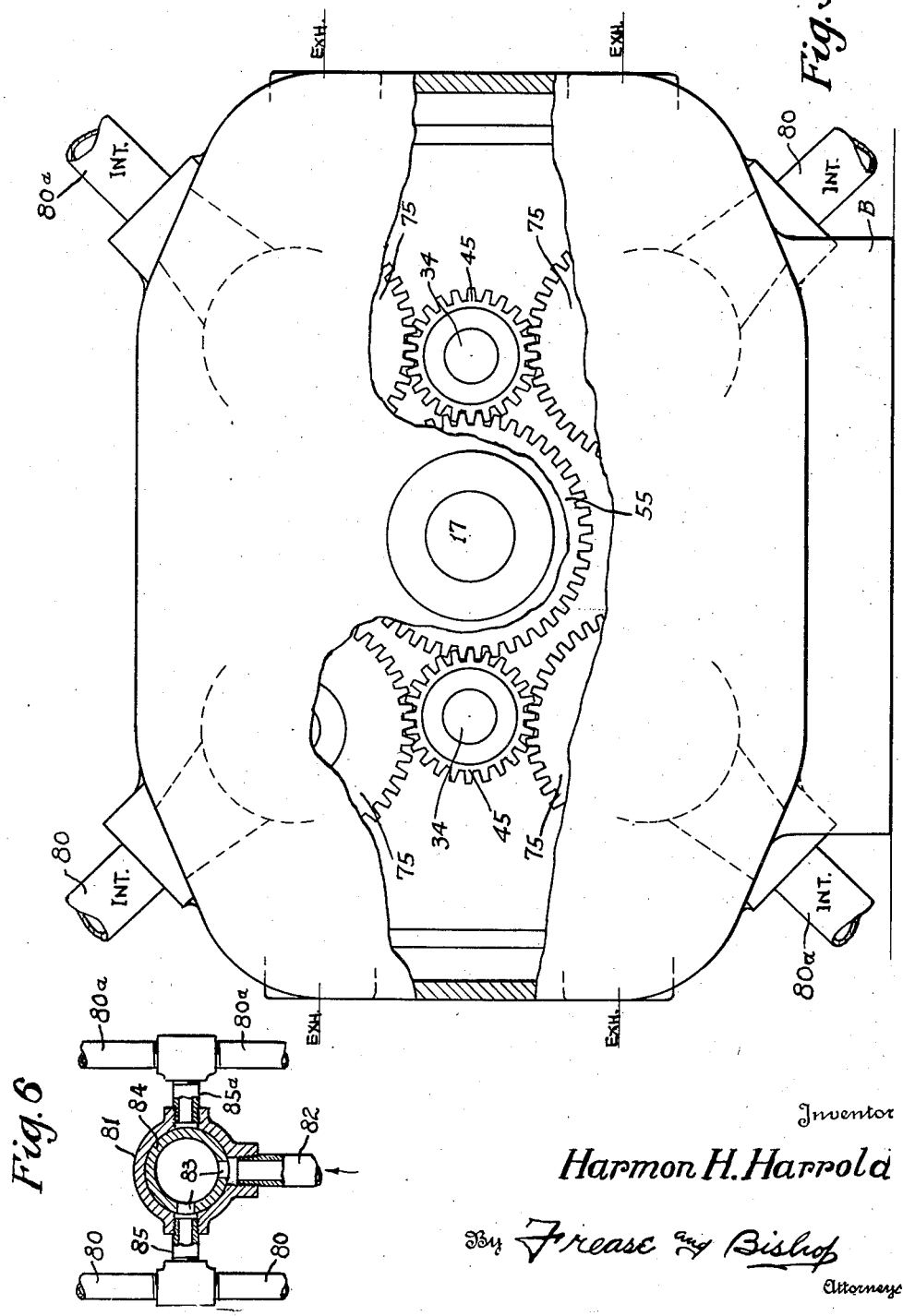

Dec. 11, 1945.   H. H. HARROLD   2,390,880
ROTARY REVERSING ENGINE
Filed Aug. 16, 1944   5 Sheets-Sheet 5

Inventor
Harmon H. Harrold
By Frease and Bishop
Attorneys

Patented Dec. 11, 1945

2,390,880

UNITED STATES PATENT OFFICE 2,390,880

ROTARY REVERSING ENGINE

Harmon H. Harrold, Wooster, Ohio, assignor of one-half to Roy Conn, Wooster, Ohio Application August 16, 1944, Serial No. 549,704

7 Claims. (Cl. 121—71)

The invention relates to rotary engines driven by steam or other fluid pressure, of the general type described in my copending application, Serial No. 520,477, filed January 31, 1944, and more particularly to a reversing engine of this type.

It is an object of the present invention to provide a rotary engine comprising a rotor, or rotary piston rotatable within a cylinder or stator housing, a rotatable cylindric abutment driven in unison with the rotor and having arcuate grooves for rolling contact with the blades of the rotor, two pairs of oppositely disposed rotary intake valves having ports communicating with the interior of the cylinder or stator housing adjacent to said rotary abutments, a rotary exhaust valve communicating with the port of each intake valve and means for closing either pair of intake valves and for opening the corresponding pair of exhaust valves whereby the rotor may be driven in either direction as desired.

Another object is to provide a rotary engine of this type in which lever and link means is provided for simultaneously opening either pair of exhaust ports and closing the other pair, and a three-way valve is provided for simultaneously admitting steam to either pair of intake valves and cutting off the steam supply to the other pair.

A further object of the invention is to provide a rotary engine of the general character referred to with means for quickly and easily reversing the operation of the rotor.

It is a still further object of the invention to generally improve the construction and details of engines of this type and to enhance the utility and serviceability thereof.

The above objects together with others which will be apparent from the drawings and following description, or which may be later referred to may be attained by constructing the improved rotary reversing engine in the manner illustrated in the accompanying drawings, in which.

Figure 1:
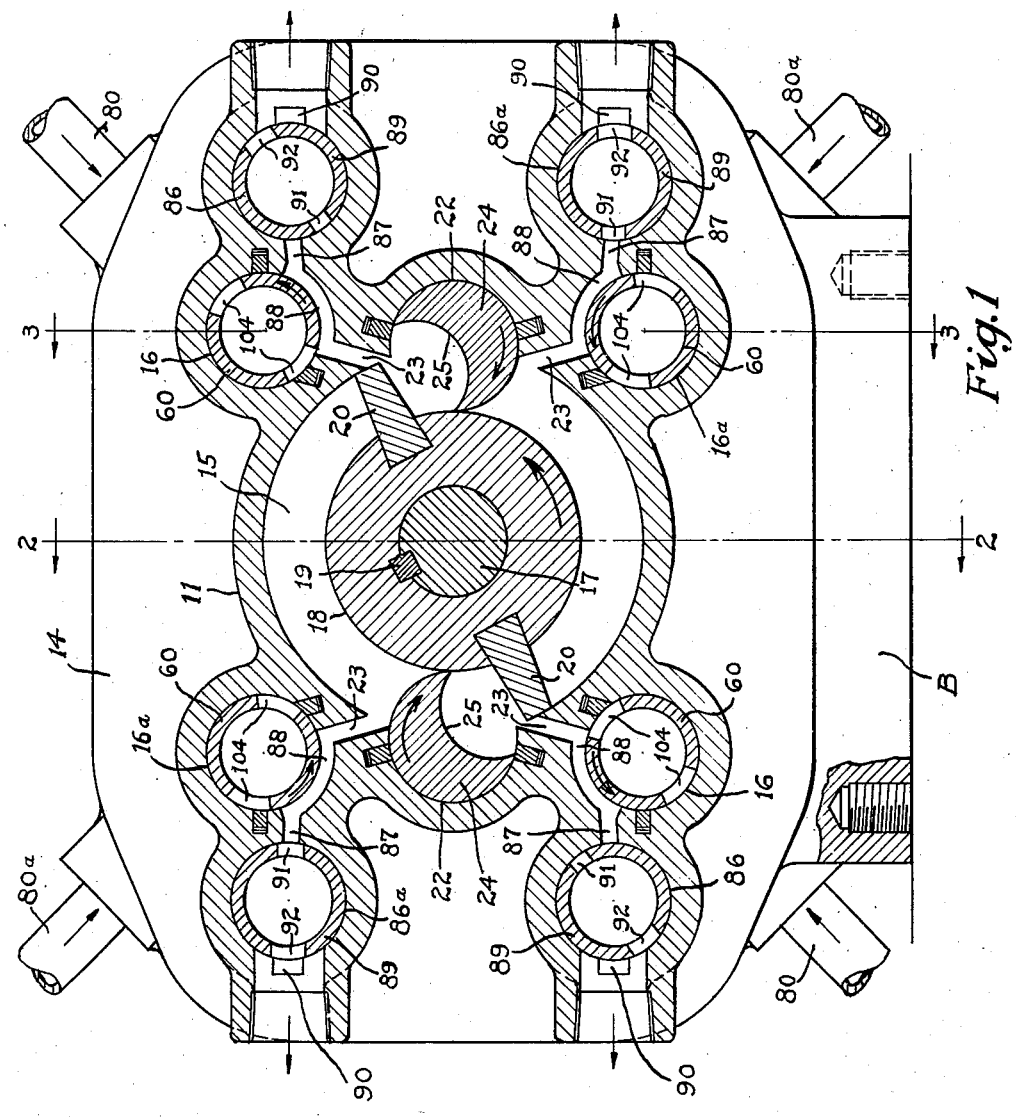
Figure 1 is a transverse sectional view through a rotary engine embodying the invention, taken on line 1—1 of Figs. 2 and 3 at a different position of rotation of the rotor.
Figure 2:
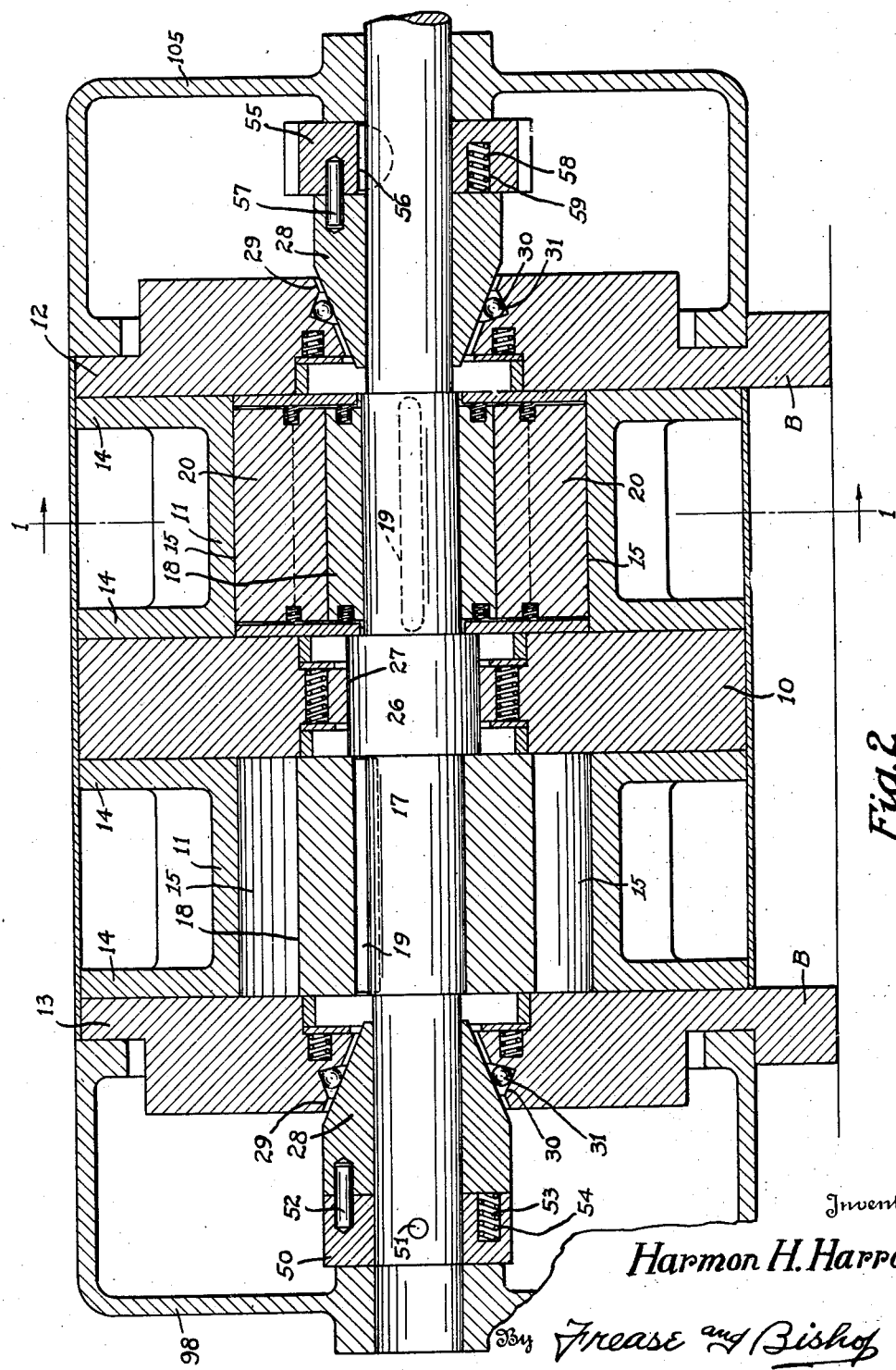
Fig. 2 is a longitudinal sectional view through the engine taken as on the line 2—2, Fig. 1.
Figure 7:
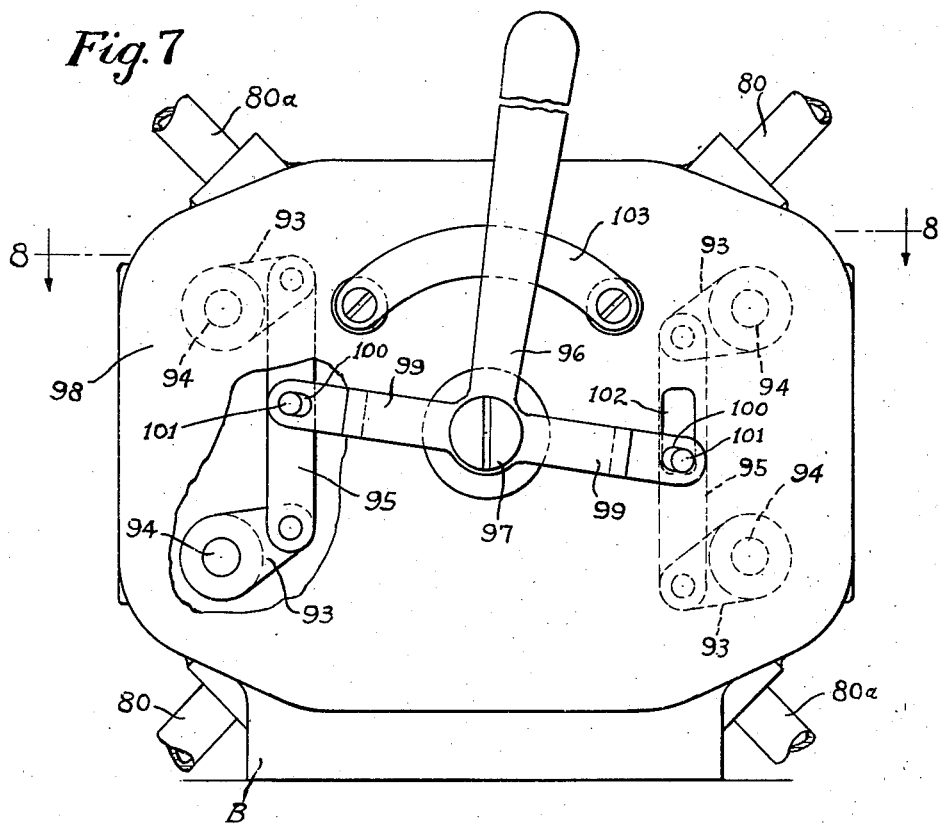
Figure 8:
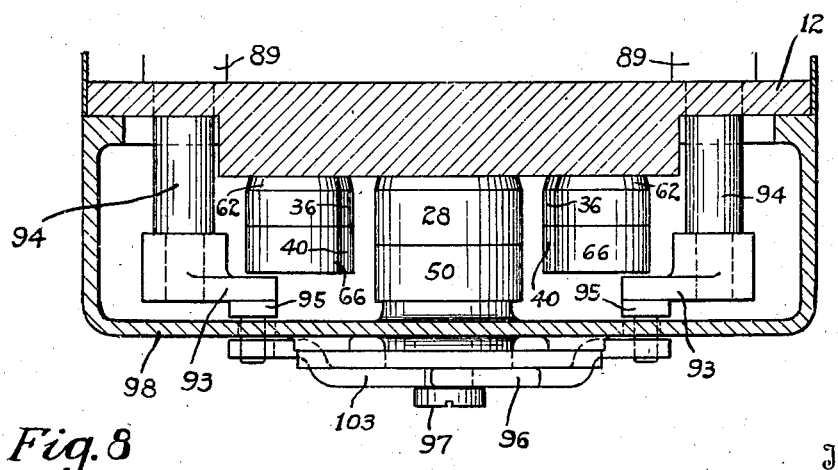

Fig. 3 a longitudinal sectional view through the engine taken as on the line 3—3, Fig. 1;

Fig. 4 a detached, transverse sectional view through one of the rotary intake valves;

Fig. 5 a front elevation of the engine with parts broken away to illustrate the gearing by means of which the rotary intake valves and rotary abutments are operated in unison with the rotor;

Fig. 6 a sectional view through the three-way valve which controls the admission of steam to the intake valves;

Fig. 7 an elevation of the rear end of the engine with parts broken away for the purpose of illustration, showing the lever and link means for operating the exhaust valves and Fig. 8 a plan sectional view taken as on the line 8—8 Fig. 7.

Referring now more particularly to the drawings, in which similar numerals refer to similar parts throughout, a dual, rotary reversing engine is illustrated in which two cylinder housings are provided, a single shaft extending through both housings and a rotor or rotary cylinder being mounted upon the shaft within each housing.

Although this engine may be made with only a single rotor within a single casing or stator housing, the dual rotors as illustrated in the drawings provide for proper balancing or equalizing of the engine and prevent the same from stopping on dead center.

The housing includes the central partition wall 10, the side walls 11 connected to each side thereof, and front and rear walls 12 and 13 respectively, connected to the outer ends of the side walls 11 and provided with bases or feet B for mounting the engine upon any suitable support. The side wall members 11, which form the stator casings, may be provided at opposite ends with flanges 14 for connection to the central partition wall 10 and front and rear walls 12 and 13 respectively.

Each of the stator casings 11 is provided with the central main compartment 15 of substantially cylindric shape, for housing each rotor or rotary cylinder as will be later described, and the similar pairs of side compartments 16 and 16a located on diametrically opposite sides of the rotor compartment for housing the intake valves.

The main shaft 17 extends longitudinally through the center of the engine, and the rotors or rotary cylinders, indicated generally at 18, are fastened thereon as by keys 19 within the main compartment 15.

Each rotor carries diametrically opposite blades 20 extending radially from its periphery, the blades in each housing being preferably located perpendicular to the blades in the other housing.

The main compartment 15 is provided at diametrically opposite sides and at points midway between the intake valve compartments 16 and 16a on each side, with semi-cylindric recesses 22, the ports 23 communicating with the intake valve compartments 16 and 16a and communicating with the main compartment 15 at opposite sides of each of said semi-cylindric recesses.

Within each semi-cylindric recess 22 is mounted a grooved, rotary abutment or cone 24 provided with a substantially half round groove 25 to alternately receive each blade 20 of the rotor as the rotor and rotary abutments are rotated in unison.

A central enlargement 26 is formed upon the main shaft 17 and journalled within the central opening 27 in the partition wall 10. Upon each end portion of the main shaft is fixed a cone 28, said cones being located within conical openings 29 formed in the front and rear walls 12 and 13 respectively.

For the purpose of providing anti-friction bearings for the main shaft, V-shape annular grooves 30 may be formed in the conical openings 29, providing race ways for the balls 31 surrounding the cones 28, thus providing ball bearings for the main shaft within each end wall of the housing.

Rotary abutments 24 extend through the central openings 32 in the central partition wall 10, and the end portions of said rotary abutments extend into the recesses 33 in the front and rear walls 12 and 13 respectively.

Each rotary abutment 24 is provided with the reduced extremities 34 and 35 at its front and rear ends respectively, and for the purpose of providing anti-friction bearings for said rotary abutments, cones 36 may be fixed upon these reduced extremities and located within the conical recesses 37 formed in the front and rear walls of the housing, V-shape annular grooves 38 being formed in said conical recesses and providing race ways for the balls 39 surrounding the cones 36, thus providing ball bearings for both ends of each rotary abutment.

A collar 40 is fixed to the rear reduced extremity 35 of each rotary abutment, as by the radial pin 41, and the adjacent cone 36 is rotatably connected to said collar as by the longitudinal pin 42, a coil spring 43 being located in a longitudinal recess 44 of the collar and bearing against the cone 36 so as to urge it inward against the balls 39.

The forward extremity 34 of each rotary abutment has a pinion 45 fixed thereon as by a radial pin 46 and a longitudinal pin 47 rotatably connects the adjacent cone 36 to said pinion. A coil spring 48 is located in a longitudinal recess 49 in the pinion and bears against the adjacent cone 36 urging it against the balls 39.

A collar 50 is fixed upon the rear extremity of the main shaft 17 as by the radial pin 51, the adjacent cone 28 may be fixed to said collar as by the longitudinal pin 52, a coil spring 53 being located in the longitudinal recess 54 in the collar bearing against the adjacent cone 28 to urge it toward the balls 31.

The gear 55 is fixed upon the forward portion of the main shaft as by the key 56 and the adjacent cone 28 is fixed to said gear as by the pin 57, and a coil spring 58 is located in the longitudinal recess 59 in said gear for urging the adjacent cone 28 toward the balls 31. The gear 55 meshes with both of the pinions 45 as shown in Fig. 5.

The intake valves include rotatable tubes 60 located through the central partition wall 10 and extending through each of the side compartments 16 and 16a in each side of the housing. The reduced rear end portion 61 of each tubular valve 60 has a cone 62 mounted thereon and located within the conical opening 63 in the rear wall 13, a V-shape annular groove 64 being formed in said conical opening and providing race ways for the balls 65 which surround the cone.

The cone 62 may be fixed to the shaft extremity 61 of the tube by means of a collar 66 fixed upon the shaft 61 as by the radial pin 67 and connected to the cone as by the longitudinal pin 68, a coil spring 69 being provided for urging the cone 62 toward the ball bearing.

A reduced shaft portion 70 is provided at the forward end of each of the tubular valves 60 and has mounted thereon a cone 71 located within the conical opening 72 of the front wall 12 of the housing which is provided with a V-shape annular groove 73 forming a race way for the balls 74 which surround the cone.

A gear 75 is fixed upon the reduced forward shaft extremity 70 of each tube 60, as by a pin 76 and each cone 71 is connected to the adjacent gear as by the longitudinal pin 77, a coil spring 78 being provided in a suitable recess in each gear for urging the adjacent cone 71 toward the balls 74. The two gears 75 on each side of the engine mesh with the corresponding pinions 45, as shown in Figs. 3 and 5 so that all four of the tubular intake valves 60 will be driven in unison.

An annular chamber 79 is provided in the central partition wall 10 surrounding the central portion of each of the rotary tubes 60. Steam inlet pipes 80 communicate with two of the annular chambers 70, namely those at the centers of the side compartments 16 while the two annular chambers at the centers of the side compartments 16a communicate with the steam inlet pipes 80a. The central portion of each tube 60 is perforated as at 81 so that steam or other pressure fluid entering the annular chamber 79 will pass through the perforation 81 to the interior of the tube.

Steam may be selectively admitted to the inlet pipes 80 or 80a by means of the three-way valve shown in Fig. 6 and indicated generally at 81. A steam supply pipe 82 connects the three-way valve 81 with a boiler or other source of fluid pressure and the ports 83 of rotatable valve 84, mounted within the housing 81 may be provided to communicate with the inlet pipe 82 and with other outlet pipes 85 or 85a as desired.

Exhaust valve compartments 86 and 86a are formed in the housing. Each of the compartments 86 or 86a is arranged to communicate with the main central compartment 15 through a port 87 communicating with the corresponding port 23 through the annular enlargement 88 at one side of the corresponding compartment 16 or 16a.

A rotatable, tubular exhaust valve 89 is mounted within each of the exhaust compartments 86 and 86a and each of these compartments communicates with an exhaust port 90.

Slots or openings 91 and 92 are formed in diametrically opposite sides of each tubular exhaust valve 89 and arranged to register with the ports 87 and 90 respectively, as shown at the upper left hand corner and lower right hand corner of Fig. 1 of the drawings, or to be moved out of registration therewith as shown in the lower left hand corner and upper right hand corner of said Fig. 1.

Means is provided for moving the exhaust valves in unison so as to simultaneously open either pair of valves and close the other pair. This operating means may comprise the lever and link mechanism shown in Figs. 7 and 8, in which levers 93 are fixed upon the reduced terminals 94 of the tubes 89, links 95 connecting the pair of levers 93 on each side of the engine.

The T-shape operating lever 96 is fulcrumed as at 97 upon the bearing housing 98 at the rearward end of the engine and the oppositely disposed arms 99 of said levers are provided with slots 100 for receiving the studs 101 fixed upon the links 95 and located through vertical slots 102 in the housing 98. The lever 96 cooperates with a quadrant 103 fixed upon the bearing housing 98, and any usual and well known means may be provided for holding the lever in adjusted position thereon.

Each of the tubular intake valves 60 is provided with diametrically opposite slots 104 arranged to alternately register with the ports 23 as the tubes are rotated. As best shown in Fig. 3 the slots 104 in each end portion of each tube 60 are located at right angles to the slots 104 at the other end portion thereof to compensate for the blades 20 of each rotor 18 being located perpendicular to the blades of the other rotor.

If desired the tubular intake valves 60 may be provided with perforated, oscillatory tubes as disclosed in my copending application above referred to so as to manually or automatically regulate the inlet of pressure fluid to the engine.

A gear housing 105 may be provided at the forward end of the engine for enclosing the gears and the main shaft 17 may be extended through said gear housing for attachment of a pulley or the like by means of which power may be taken from the engine.

The several moving parts of the engine may be sealed so as to prevent leakage of steam or pressure fluid by means of a plurality of spring loaded rings and bars as shown in the drawings and described in detail in my copending application.

In the operation of the engine, assuming the parts to be in the positions shown in Fig. 1, the three-way valve 81 should be in the position shown in Fig. 6 admitting steam from the boiler through the pipe 82 to the pipe 80 which communicate with the rotating tubular valves 60 in the compartments 16. In this position of the three-way valve it will be seen that no steam is admitted through the pipes 80a to the valves 60 in the compartments 16a.

The lever 96, as shown in Figs. 7 and 8, is operated to rotate the tubular exhaust valves 89 to the positions shown in Fig. 1 so that the ports 87 of the compartments 16a communicate with the ports 91 of the corresponding exhaust valves while the ports 92 of these exhaust valves communicate with the corresponding exhaust ports 90. The other pair of exhaust valves 89 are at this time in position to cut off communication between the ports 87 of the compartments 16 and the corresponding exhaust ports 90.

Steam or other pressure fluid is thus admitted to the tubular rotary intake valves 60 in the compartments 16, filling said tubular valves in both directions from the center and passing alternately through the slots 104 of said valves as they register with the corresponding ports 23.

The steam as it enters the main compartment 15, through these ports 23, is admitted behind the blades 20 of the rotor and acts thereon expansively rotating the rotor in counter clockwise direction as viewed in Fig. 1, until the blades reach the ports 23 of the compartments 16a when the exhaust steam is discharged therethrough by the continued forward motion of the other blade 20.

As each blade 20 of the rotor approaches one or the other of the rotary abutments 24, which are being rotated in clockwise direction, the blade will be received in the arcuate groove 25 of said rotary abutment, and as the two members are moved at proper relative speeds the periphery of the blade will have rolling contact with the groove in the abutment, riding therethrough and maintaining a tight seal at all times.

As each blade of the rotor passes through the groove of one of the rotary abutments and clears the adjacent inlet port 23 of one of the compartments 16, steam is admitted to the main compartment 15 through the intake valves 60 in the compartments 16 and through the ports 23 thereof, and the rotation of the rotor continues.

When it is desired to reverse the rotation of the engine the three-way valve shown in Fig. 6 is operated to connect the inlet port 82 with the outlet port 85a admitting steam through the pipes 80a to the compartments 16a and cutting off the admission of steam through the pipe 80 to the compartments 16.

The lever 96 is moved to the opposite position from that shown in Figs. 7 and 8, closing the exhaust valves 89 in the compartments 86a and opening the exhaust valve 89 in the compartments 86. The operation of the engine will then be the same as above described excepting the rotor and rotary intake valves 60 will be driven in clockwise direction, as viewed in Fig. 1 while the rotary abutments 24 will be driven in counterclockwise direction.

From the above it will be obvious that a simple efficient and easily operated mechanism is provided for quickly and easily reversing the engine by operating either pair of intake valves and closing the corresponding pair of exhaust valves.

I claim:

1. A rotary reversing engine comprising a casing having a central main compartment, two pairs of diametrically opposed intake valve compartments communicating with the main compartment through ports, a substantially half cylindric recess in the wall of the main compartment between each pair of said ports, an exhaust valve compartment adjacent to each intake valve compartment there being an annular enlargement in each intake valve compartment surrounding the intake valve therein and forming a by-pass communicating with the adjacent port and with the adjacent exhaust valve compartment, a rotor in the main compartment having two diametrically opposed blades the peripheries of which contact the walls of the main compartment, a rotary abutment in each recess and having an arcuate groove for rolling contact with the peripheries of said blades, a rotary, tubular intake valve in each intake valve compartment having diametrically opposite slots arranged to alternately register with said ports, an oscillatory, tubular exhaust valve in each exhaust valve compartment, means for selectively admitting fluid pressure to either pair of intake valves and means for oscillating the exhaust valve to close the corresponding pair of exhaust valves and to simultaneously open the other pair.

2. A rotary reversing engine comprising a casing having a central main compartment, two pairs of diametrically opposed intake valve compartments communicating with the main compartment through ports, a substantially half cylindric recess in the wall of the main compartment between each pair of said ports, an exhaust valve compartment adjacent to each intake valve compartment there being an annular enlargement in each intake valve compartment surrounding the intake valve therein and forming a by-pass communicating with the adjacent port and with the adjacent exhaust valve compartment, a rotor in the main compartment having two diametrically opposed blades the peripheries of which contact the walls of the main compartment, a rotary abutment in each recess and having an arcuate groove for rolling contact with the peripheries of said blades, a rotary, tubular intake valve in each intake valve compartment having diametrically opposite slots arranged to alternately register with said ports, an oscillatory, tubular exhaust valve in each exhaust valve compartment, means for selectively admitting fluid pressure to either pair of intake valves and means for closing the corresponding pair of exhaust valves and simultaneously opening the other pair.

3. A rotary reversing engine comprising a casing having a central main compartment, two pairs of diametrically opposed intake valve compartments communicating with the main compartment through ports, a substantially half cylindric recess in the wall of the main compartment between each pair of said ports, an exhaust valve compartment adjacent to each intake valve compartment there being an annular enlargement in each intake valve compartment surrounding the intake valve therein and forming a by-pass communicating with the adjacent port and with the adjacent exhaust valve compartment, a rotor in the main compartment having two diametrically opposed blades, the peripheries of which contact the walls of the main compartment, a rotary abutment in each recess and having an arcuate groove for rolling contact with the peripheries of said blades, a rotary, tubular intake valve in each intake valve compartment having diametrically opposite slots arranged to alternately register with said ports, an oscillatory, tubular exhaust valve in each exhaust valve compartment, an exhaust port communicating with each exhaust valve compartment, an oscillatory tubular exhaust valve in each exhaust valve compartment, and having openings therein to register with the corresponding intake valve compartment and exhaust port, means for oscillating the exhaust valves to close either pair thereof and simultaneously open the other pair, and means for selectively admitting fluid pressure to either pair of intake valves.

4. A rotary reversing engine comprising a casing having a central main compartment, two pairs of diametrically opposed intake valve compartments communicating with the main compartment through ports, a substantially half cylindric recess in the wall of the main compartment between each pair of said ports, an exhaust valve compartment adjacent to each intake valve compartment there being an annular enlargement in each intake valve compartment surrounding the intake valve therein and forming a by-pass communicating with the adjacent port and with the adjacent exhaust valve compartment, a rotor in the main compartment having two diametrically opposed blades the peripheries of which contact the walls of the main compartment, a rotary abutment in each recess and having an arcuate groove for rolling contact with the peripheries of said blades, a rotary, tubular intake valve in each intake valve compartment having diametrically opposite slots arranged to alternately register with said ports, means for rotating the tubular intake valves at the same speed as the rotor and for rotating the rotary abutments at twice the speed of the rotor.

5. A rotary reversing engine comprising a casing having a central main compartment, two pairs of diametrically opposed intake valve compartments communicating with the main compartment through ports, a substantially half cylindric recess in the wall of the main compartment between each pair of said ports, an exhaust valve compartment adjacent to each intake valve compartment, there being an annular enlargement in each intake valve compartment surrounding the intake valve therein and forming a by-pass communicating with the adjacent port and with the adjacent exhaust valve compartment, a rotor in the main compartment having two diametrically opposed blades the peripheries of which contact the walls of the main compartment, a rotary abutment in each recess and having an arcuate groove for rolling contact with the peripheries of said blades, a rotary, tubular, slotted intake valve in each intake valve compartment, means for rotating the tubular intake valves, means for rotating the rotary abutments at twice the speed of the rotor and in the opposite direction, an oscillatory tubular exhaust valve in each exhaust valve compartment, means for oscillating the exhaust valves to close either pair thereof and open the other pair and means for selectively admitting fluid to either pair of intake valves.

6. A rotary reversing engine comprising a casing having a central main compartment, two pairs of diametrically opposed intake valve compartments communicating with the main compartment through ports, a substantially half cylindric recess in the wall of the main compartment between each pair of said ports, an exhaust valve compartment adjacent to each intake valve compartment there being an annular enlargement in each intake valve compartment surrounding the intake valve therein and forming a by-pass communicating with the adjacent port and with the adjacent exhaust valve compartment, a rotor in the main compartment having two diametrically opposed blades, the peripheries of which contact the walls of the main compartment, a rotary abutment in each recess and having an arcuate groove for rolling contact with the peripheries of said blades, a rotary, tubular intake valve in each intake valve compartment having diametrically opposite slots arranged to alternately register with said ports, an oscillatory, tubular exhaust valve in each exhaust valve compartment, means for selectively admitting fluid pressure to either pair of intake valves, levers fixed upon the ends of the exhaust valves, links connecting the lever on one exhaust valve of each pair with the lever on one exhaust valve of the other pair and a lever connected to said links for oscillating the exhaust valves to close either pair thereof and open the other pair.

7. A rotary reversing engine comprising a casing having a central main compartment, two pairs of diametrically opposed intake compartments communicating with the main compartment through parts, a substantially half cylindric recess in the wall of the main compartment between each pair of said ports, an exhaust valve compartment adjacent to each intake compartment there being an annular enlargement in each intake valve compartment surrounding the intake valve therein and forming a by-pass communicating with the adjacent port and with the adjacent exhaust valve compartment, a rotor in the main compartment having two diametrically opposed blades the peripheries of which contact the walls of the main compartment a rotary abutment in each recess and having an arcuate groove for rolling contact with the peripheries of said blades, exhaust valves in the exhaust valve compartments, means for selectively admitting fluid pressure to either pair of intake compartments and means for closing the corresponding pair of exhaust valves and opening the other pair.

HARMON H. HARROLD.